United States Patent
Huang

(10) Patent No.: US 6,678,077 B1
(45) Date of Patent: Jan. 13, 2004

(54) MULTI-DIRECTION OPENING LID STRUCTURE

(75) Inventor: Chih-Wen Huang, Hsinchu (TW)

(73) Assignee: Umax Data Systems, Inc (TW)

( * ) Notice: Subject to any disclaimer, the term of this patent is extended or adjusted under 35 U.S.C. 154(b) by 628 days.

(21) Appl. No.: 09/684,098

(22) Filed: Oct. 6, 2000

(51) Int. Cl.[7] .......................... H04N 1/04; G03G 15/00
(52) U.S. Cl. ..................... 358/497; 358/474; 358/471; 399/380
(58) Field of Search ................ 358/471, 474, 358/494, 400, 500, 501, 401, 505, 506, 487; 399/380, 379, 211; 355/75; 16/272, 266

(56) References Cited

U.S. PATENT DOCUMENTS 6,163,668 A * 12/2000 Takahashi et al. .......... 399/380
6,408,161 B1 * 6/2002 Minowa et al. ............. 399/380

FOREIGN PATENT DOCUMENTS

JP          2001-249419      * 9/2001

* cited by examiner

*Primary Examiner*—Cheukfan Lee

(57) ABSTRACT

A multi-direction opening lid structure for scanner includes a lid which has a plurality of novel hooks located at the side rims under the bottom surface thereof. The scanner body has a plurality of troughs formed therein to engage with the hooks for the lid to lay horizontally on the scanner body. Any one side of any two parallel sides of the lid may be lifted and opened for the hooks at the opposite side to turn and engage with the body. From the horizontal position laid on the body, the lid may be lifted and opened at any side desired.

6 Claims, 7 Drawing Sheets

MULTI-DIRECTION OPENING LID STRUCTURE

BACKGROUND OF THE INVENTION

1. Field of the Invention

The present invention relates to a multi-direction opening lid structure and particularly a novel lid that has a plurality of hooks located at bottom rims thereof for engaging with mating troughs located in the scanner body to enable the lid be opened in any of four sides.

2. Description of the Prior Art

Technology innovation in recent years has spawned a great number of new products, particularly in electronic and computer industries. Because of fierce competition and continuous research and development, many products become very popular and widely accepted, while the prices drop continuously. Scanner is one of such products. Scanner manufacturers generally focus their research and development on improvements in optical resolution and software driver programs. Not many of them have given much effort on improving external structure. For instance, to use scanner in a restrictive working space could be an annoying problem, particularly when scanner lid can be lifted and opened in only one direction as most conventional scanners do now. One of the areas worth pursing is to make scanner lid openable in all directions.

FIG. 1 shows a Utility Model Patent disclosed in ROC Patent Publication No. 377936, titled "Multi-Direction Opening Lid for Table Top Scanner". It has a lid 41, a frame 42, two linkage bars 43 and a plurality of spindles 44. The spindles 44 serve as pivotal joints to engage with the lid 41, linkage bars 43 and frame 42. FIG. 2 shows one of the lid opening states. The lid 41 may engage with the scanner at one end thereof, and may be opened at a front, left or right side in three directions. However it has a complicated structure. It needs additional structure such as linkage bars 43 and frame 42. Production cost is higher. The three ways lid opening still has operational limitation. Space for holding the document is different when the lid is opened at different side. It is difficult to position and align scanning document accurately, and may result in non-complete scanning and lost of data. All this begs for improvement.

SUMMARY OF THE INVENTION

The present invention aims at resolving the problems existed in conventional scanners set forth above and providing a multi-direction lid opening structure in which the lid may be integrally made by plastic injection molding. The lid has a plurality of novel hooks located at side rims of the bottom side thereof. The scanner body has a plurality of latch means located at the top rims thereof mating and engageable with the hooks. The lid may flatly cover the scanner body and may be lifted at each of the four sides. The document holding space above scanner body after the lid is opened is same regardless which side the lid being opened. Hence scanning documents may be positioned easily and accurately. The structure is simple and reliable, and may be produced at a low cost.

For achieving aforesaid object, the present invention includes:
- a lid located above the scanner body for covering scanning document during scanning operation,
- a plurality of hooks located at the side rims below the bottom surface of the lid. Each hook has a shoulder attached to the bottom surface, a narrow neck extended downward from the shoulder, and a latch member attached to the neck and having two extended fingers, and
- a scanner body having a plurality of troughs. Each trough has a latch opening engageable with the hook for the lid to cover the top of the scanner.

In one aspect, the lid and hooks are integrally made by means of plastic injection molding process. The lid may be laid on the scanner body horizontally, and may be lifted and opened at either of the four sides. When the lid is opened, the latch member may engage with an anchor block located in the scanner body to prevent the lid from breaking away from the scanner body.

BRIEF DESCRIPTION OF THE DRAWINGS

The invention, as well as its many advantages, may be further understood by the following detailed description and drawings, in which.

DETAILED DESCRIPTION OF THE PREFERRED EMBODIMENT

The present invention aims at providing a multi-direction opening lid structure. The lid has a plurality of novel hooks located at the side rims under the bottom surface of the lid. The scanner body has mating troughs against the hooks for the lid to lay horizontally on the scanner body. The lid may be lifted and opened at any of the two parallel sides. The hooks at the opposite side which is not being lifted will be moved into the scanner body and engage with an anchor block located in the scanner body. The lid may be lifted and opened at any of the four sides. Users may choose whatever side desired to open the lid for scanning operation. Scanner installation location may be selected more flexibly. User operation of the scanner may also be more convenient.

Figure 1:
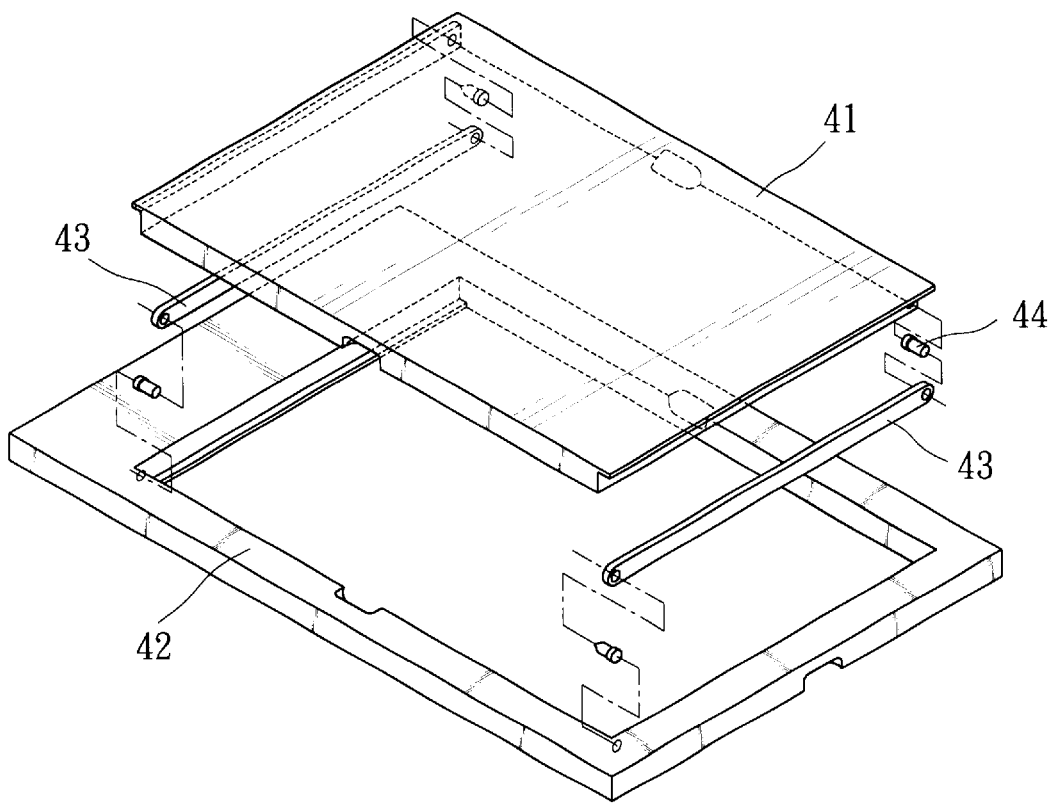
FIG. 1 is an exploded view of a conventional lid structure.
Figure 2:
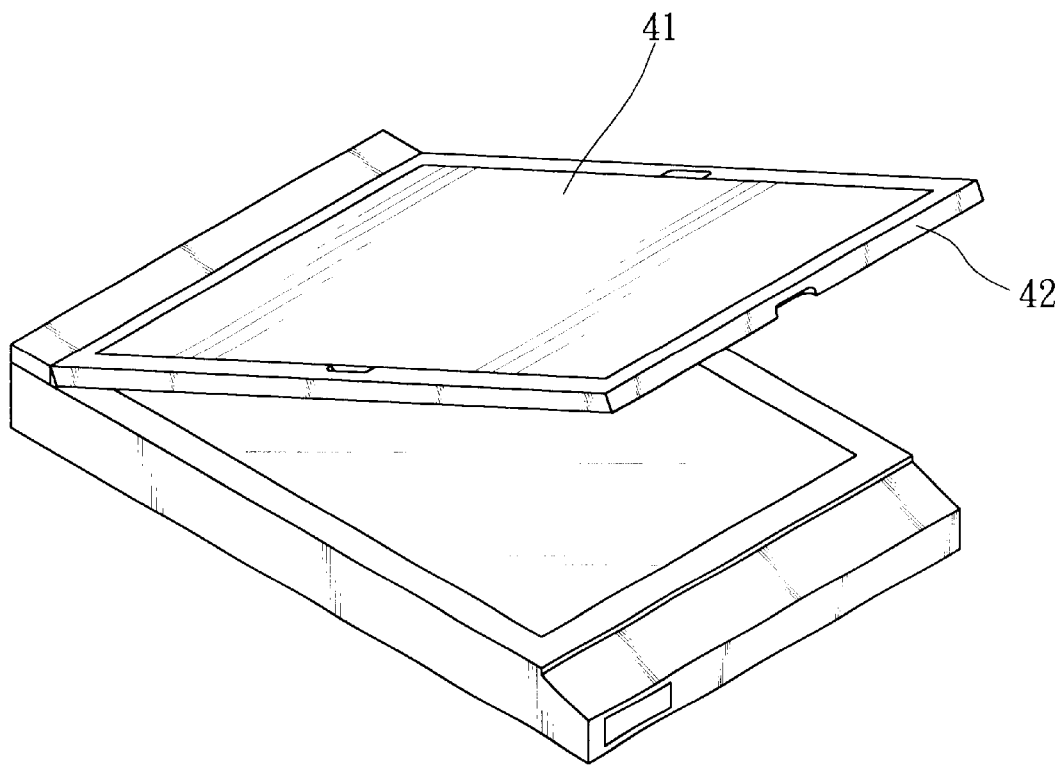
FIG. 2 is a perspective view of the lid shown in FIG. 1 being opened above a scanner.
Figure 3:
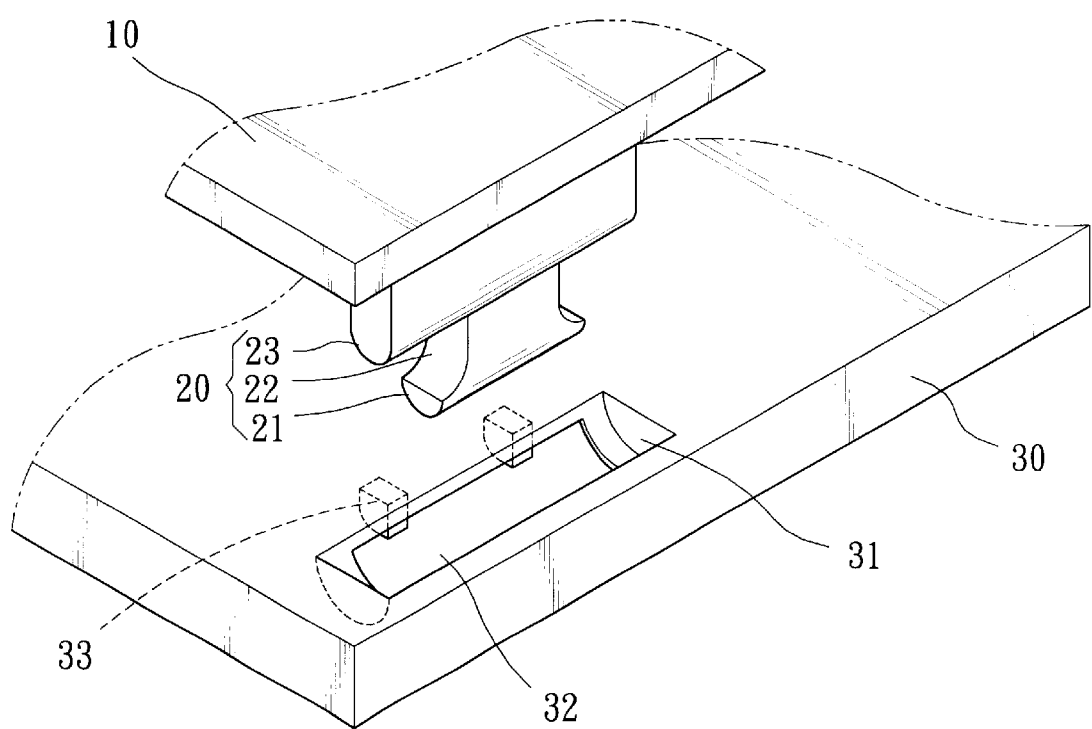
FIG. 3 is an exploded view of the present invention.

Referring to FIG. 3, the lid structure according the present invention includes a lid 10, a plurality of hooks 20 and a scanner body 30. The lid 10 and hooks 20 may be integrally made by means of plastic injection molding process. The hooks 20 are located at the side rims under the bottom surface of the lid 10. Each hook 20 has a shoulder 23 which has a top end attached to the bottom surface of the lid 10 and a curved lower end, a narrow neck 22 extended downward from the curved lower end of the shoulder 23, and a latch member 21 extended downward from the neck 22. The latch member 21 is shorter than the shoulder 23 and forms two curved sides to engage with the narrower neck 22.

The scanner body 30 has a top surface which has a plurality of semi-circle troughs 31 formed at the side rims mating against the hooks 20. Each trough 31 has a latch opening 31 which is slightly longer than the latch member 21. Inside the scanner body 30 and adjacent the latch opening 32, there are a pair of spaced anchor blocks 33. The anchor blocks 33 have an interval distance longer than the width of the neck 22 but shorter than the length of the latch member 21 (also shown in FIG. 4). The latch opening 32 has a width allowing the neck 22 to turn about therein.

Figure 4:
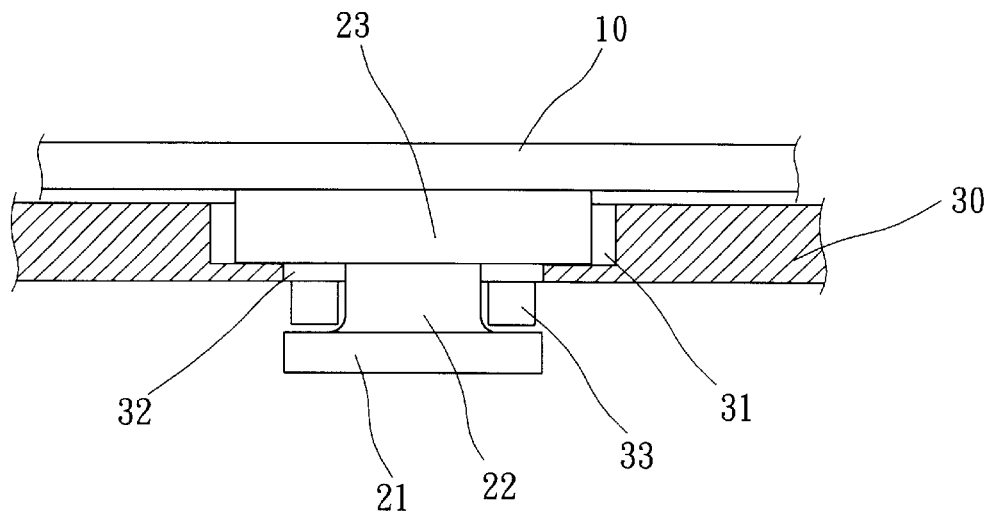
FIG. 4 is a fragmentary schematic front view the present invention, at a latched position.

Referring to FIG. 4, when the lid 10 is horizontally laid on the top surface of the scanner body 30 at a latched position, the latch member 21 and neck 22 may pass through the latch opening 32 while the shoulder 23 is resting in the trough 31. It forms a stationary state.

Figure 5:
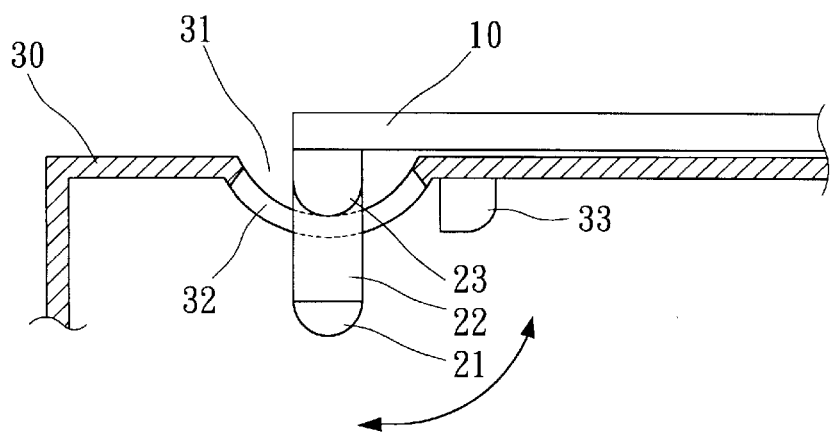
FIG. 5 is a fragmentary schematic side view the present invention, at a latched position.
Figure 6:
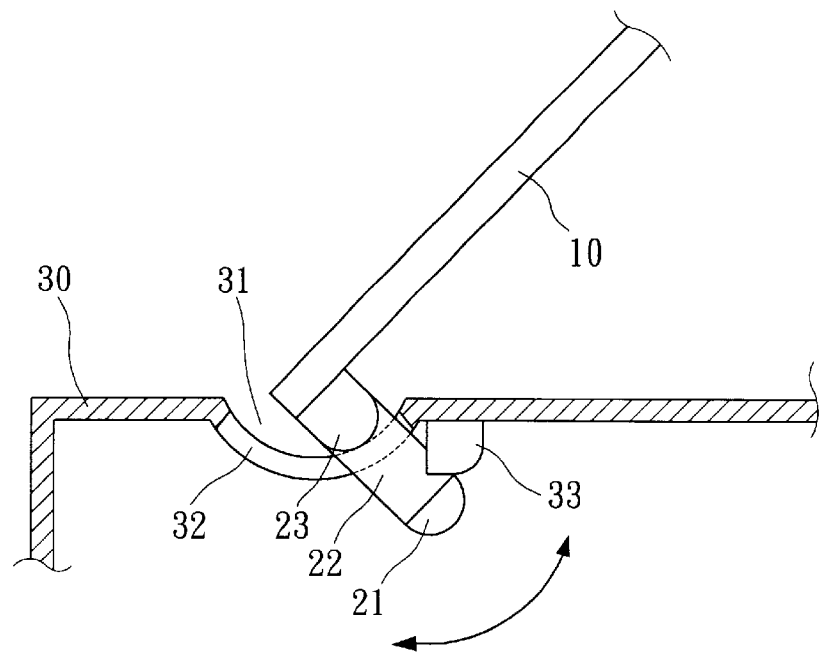
FIG. 6 is a fragmentary schematic side view the present invention, at a lifted position.

Referring to FIGS. 5 and 6 for the present invention in use, the lid 10 may be lifted and opened at any selected side (at the right side in this example). When the lid 10 is lifted at the right side, the hook 20 at the left side will be moved and turned in the trough 31 to enable the lid 10 be turned in counter clockwise direction. The neck 22 will be turned angularly and pushes the latch member 21 engaging with the anchor block 33 at a rear side thereof (FIG. 6). The lid 10 then may be opened and held firmly at an angle desired. By the same token, the lid 10 may also be opened at the left side, front side and rear side as well.

Figure 7:
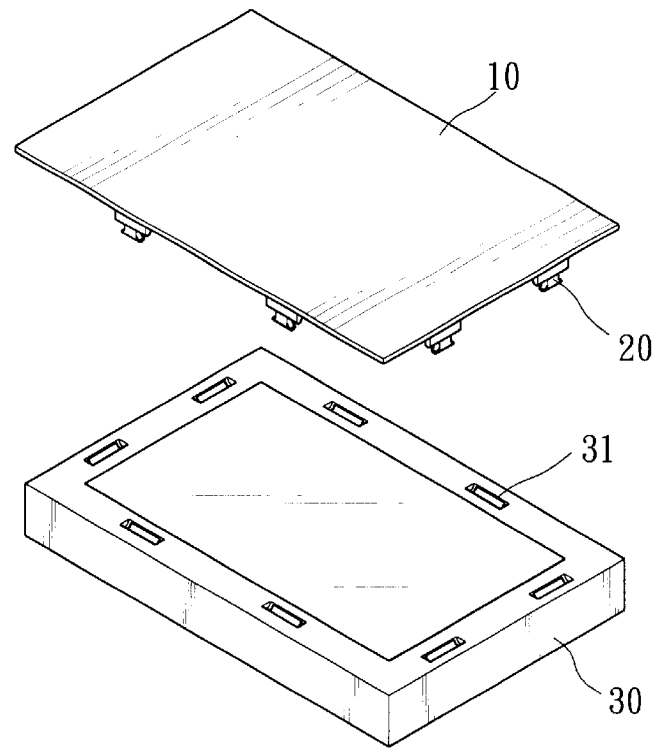
FIG. 7 is a perspective view of the present invention, before engaging with a scanner body.
Figure 8:
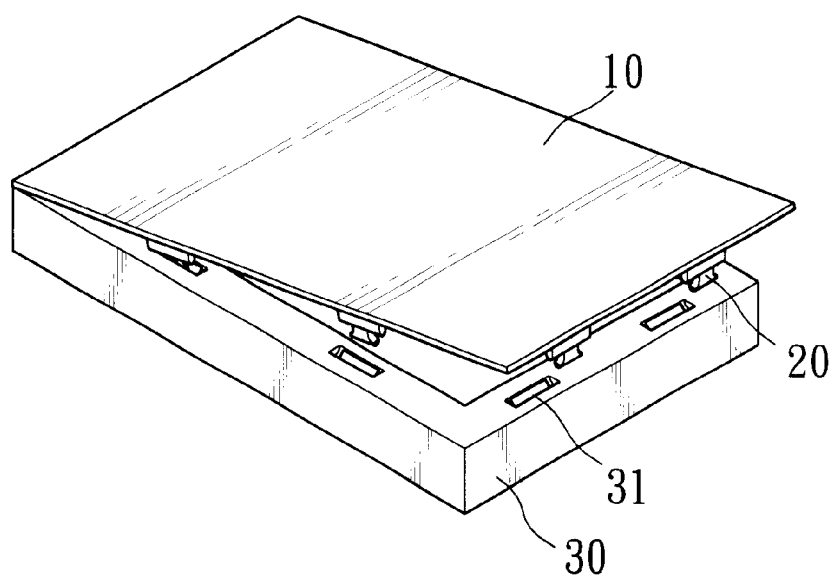
FIG. 8 is a perspective view of the present invention, showing the lid being lifted at the right side.

FIG. 7 shows the lid 10 of the present invention before being laid on he scanner body 30. There are hooks 20 facing downward at the bottom surface of the lid 10. The scanner body 30 has troughs 31 formed in the top surface to mate and engage with the hooks 20 for the lid 10 to lay and latch thereon horizontally. It is to be noted that, for the present invention to work properly, the lid 10 should be horizontally latched with the scanner body 30 first.

Figure 9:
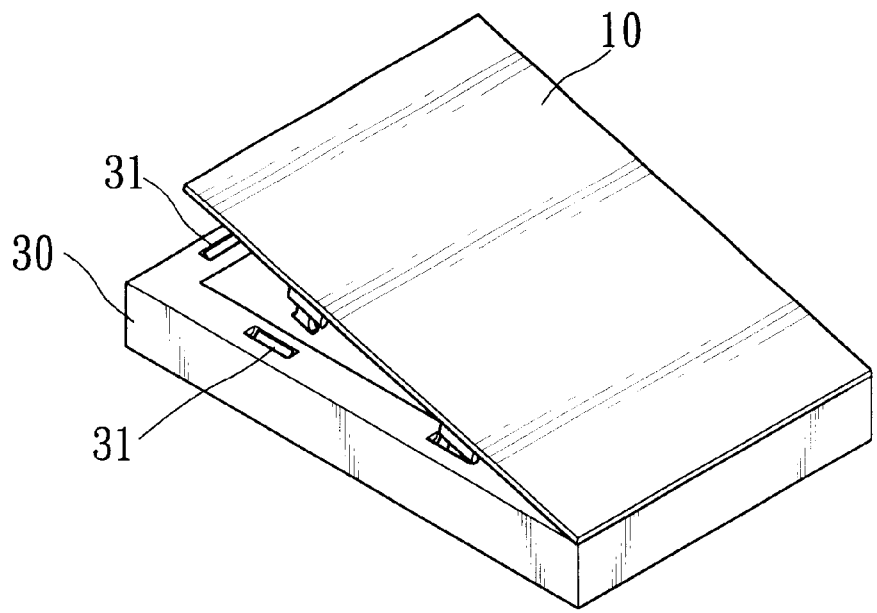
FIG. 9 is a perspective view of the present invention, showing the lid being lifted at the left side.
Figure 10:
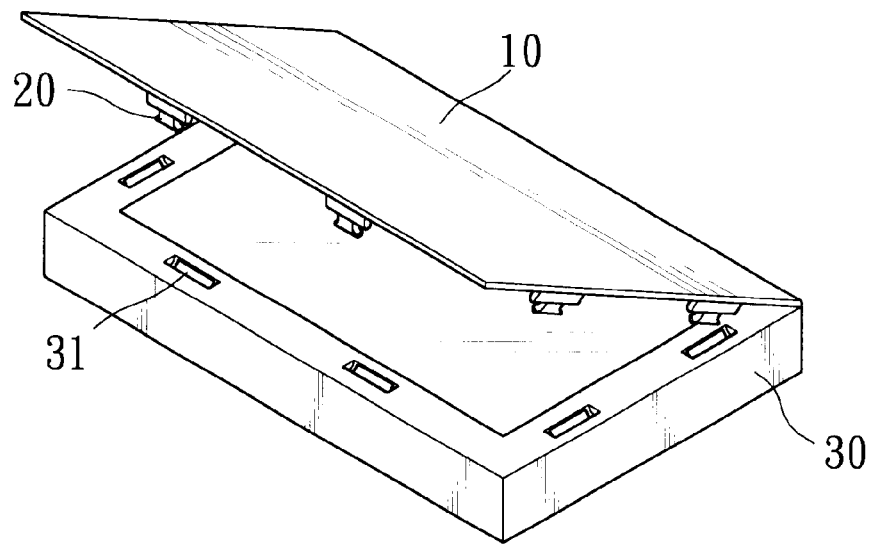
FIG. 10 is a perspective view of the present invention, showing the lid being lifted at the front side.
Figure 11:
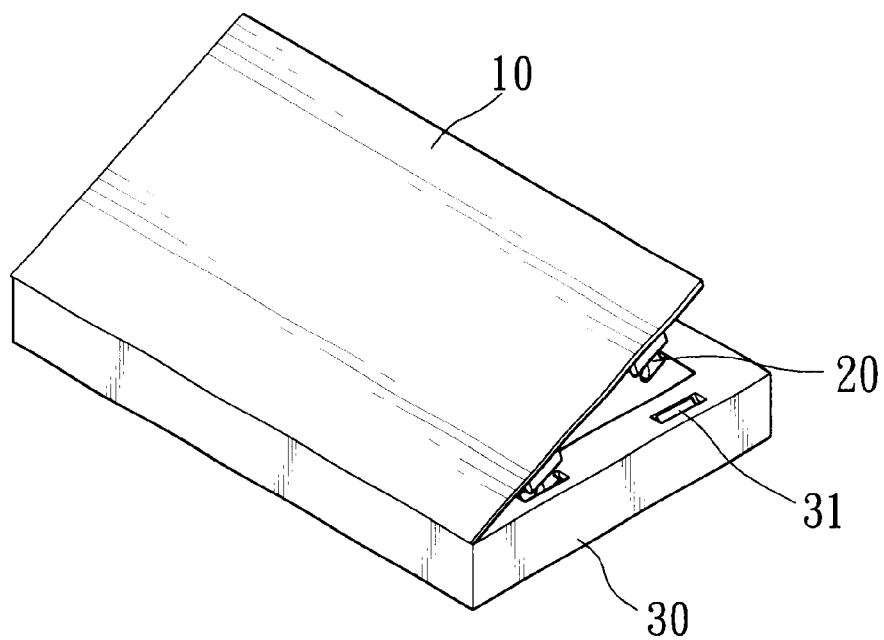
FIG. 11 is a perspective view of the present invention, showing the lid being lifted at the rear side.

FIG. 9 through 11 show the present invention being used at different situations, including the lid 10 being opened at the right side, left side, front side and rear side of a scanner.

As a result, the present invention offers great versatility for scanner installation and operation. The scanner may be placed at some odd sites such as a corner, cabinet, special purpose table and the like that have restrictive conditions that might otherwise not be fully utilized. Users may have a wide range of operation options to suit their requirements and preference.

While the preferred embodiment of the invention has been set forth for purpose of disclosure, it would be obvious to those skilled in the art that various other changes and modifications can be made without departing from the spirit and scope of this invention.

What is claimed is:

1. A multi-direction opening lid structure, comprising:

a lid having a plurality of hooks located below a bottom surface and side rims thereof, each hook having a shoulder, a latch member and a neck fixedly located therebetween, the shoulder having a top end attached to the bottom surface, the latch member having a greater length than the neck, and a body having a top surface which has a plurality of troughs formed therein, each trough having a latch opening formed at a bottom wall thereof for engaging with the hook, wherein the lid may be laid horizontally on the top surface and opened at multiple sides for holding a document thereunder for a scanner to perform scanning operation.

2. The multi-direction opening lid structure according to claim 1, wherein the lid and hooks are integrally made by means of plastic injection molding process.

3. The multi-direction opening lid structure according to claim 1, wherein the lid is held on the body and may be opened in a front, rear, left or right direction.

4. The multi-direction opening lid structure according to claim 1, wherein the shoulder and latch member have respectively a curved bottom end, the shoulder has a greater length than the latch member.

5. The multi-direction opening lid structure according to claim 1, wherein the trough has a semicircle cross section for the shoulder to turn therein in a curve.

6. The multi-direction opening lid structure according to claim 1, wherein the lid may be lifted at any one side thereof for the latch member to turn an angle to engage with an anchor block located in the body to form a brake means when the lid is being lifted.

* * * * *